US005594761A

United States Patent [19]
Brown

[11] Patent Number: 5,594,761
[45] Date of Patent: Jan. 14, 1997

[54] CONTROL CHANNEL TIMING DETECTION AND SELF CORRECTION FOR DIGITALLY TRUNKED SIMULCAST RADIO COMMUNICATIONS SYSTEM

[75] Inventor: Thomas A. Brown, Lynchburg, Va.

[73] Assignee: Ericsson Inc., Research Triangle Park, N.C.

[21] Appl. No.: 253,600

[22] Filed: Jun. 3, 1994

Related U.S. Application Data

[63] Continuation of Ser. No. 906,438, Jun. 30, 1992, abandoned.

[51] Int. Cl.[6] .................................................. H04L 7/00
[52] U.S. Cl. ........................ 375/356; 375/359; 455/51.2
[58] Field of Search ...................... 375/356, 354, 375/359; 370/105.1, 100.1; 455/51.1, 51.2; 371/67.1, 68.1, 68.2, 71, 61

[56] References Cited

U.S. PATENT DOCUMENTS

| | | |
|---|---|---|
| 3,902,161 | 8/1975 | Kiowski et al. . |
| 4,218,654 | 8/1980 | Ogawa et al. . |
| 4,255,814 | 3/1981 | Osborn . |
| 4,317,220 | 2/1982 | Martin . |
| 4,411,007 | 10/1983 | Rodman et al. . |
| 4,414,661 | 11/1983 | Karlstrom . |
| 4,472,802 | 9/1984 | Pin et al. . |
| 4,475,246 | 10/1984 | Batlivala et al. . |
| 4,516,269 | 5/1985 | Krinock . |
| 4,525,861 | 6/1985 | Freeburg . |
| 4,570,265 | 2/1986 | Thro . |
| 4,578,815 | 3/1986 | Persinotti . |
| 4,597,105 | 6/1986 | Freeburg . |
| 4,608,699 | 8/1986 | Batlivala et al. . |
| 4,696,051 | 9/1987 | Breeden . |
| 4,696,052 | 9/1987 | Breeden . |
| 4,718,109 | 1/1988 | Breeden et al. . |
| 4,782,499 | 11/1988 | Clendening . |
| 4,800,564 | 1/1989 | DeFazio et al. ........................ 371/61 |
| 4,850,032 | 7/1989 | Freeburg . |
| 4,903,262 | 2/1990 | Dissosway et al. . |
| 4,903,321 | 2/1990 | Hall et al. . |
| 4,905,302 | 2/1990 | Childress et al. . |
| 4,918,437 | 4/1990 | Jasinski et al. . |
| 4,926,496 | 5/1990 | Cole et al. . |
| 4,939,746 | 7/1990 | Childress . |
| 4,968,966 | 11/1990 | Jasinski et al. . |
| 4,972,410 | 11/1990 | Cohen et al. . |
| 5,003,617 | 3/1991 | Epsom et al. . |
| 5,014,344 | 5/1991 | Goldberg . |
| 5,046,128 | 9/1991 | Bennett . |
| 5,052,028 | 9/1991 | Zwack . |
| 5,054,113 | 10/1991 | Jasinski ................................ 455/51.2 |
| 5,105,439 | 4/1992 | Bennett et al. ........................ 375/110 |
| 5,127,101 | 6/1992 | Rose, Jr. . |
| 5,172,396 | 12/1992 | Rose, Jr. et al. . |
| 5,218,717 | 6/1993 | Reitberger ............................ 455/56.1 |
| 5,257,404 | 10/1993 | Goreham et al. ..................... 455/51.2 |
| 5,416,808 | 5/1995 | Witsaman et al. .................... 455/51.2 |

OTHER PUBLICATIONS

"A New Modulation Scheme for Multitransmitter Simulcast Digital Mobile Radio Communication", Hattori et al., Electrical Communication Laboratories Nippon Telegraph and Telephone Public Corp., pp. 83–88.

*Primary Examiner*—Stephen Chin
*Assistant Examiner*—Hai H. Phan
*Attorney, Agent, or Firm*—Nixon & Vanderhye P.C.

[57] ABSTRACT

A control channel timing monitor for a simulcast radio frequency (RF) digitally trunked mobile radio communications system continually monitors the outbound control channel timing of each of plural simulcasting transmitting sites. The timing of such monitored signals obtained "over the air" is compared relative to one another and/or to a reference. Fault indications identifying specific sites having faulty synchronization are produced when such comparison indicates lack of synchronization within a programmable tolerance. Appropriate corrective action (e.g., bringing down the control channel and transferring its function to a frequency formerly used for working channel functions) is taken.

17 Claims, 9 Drawing Sheets

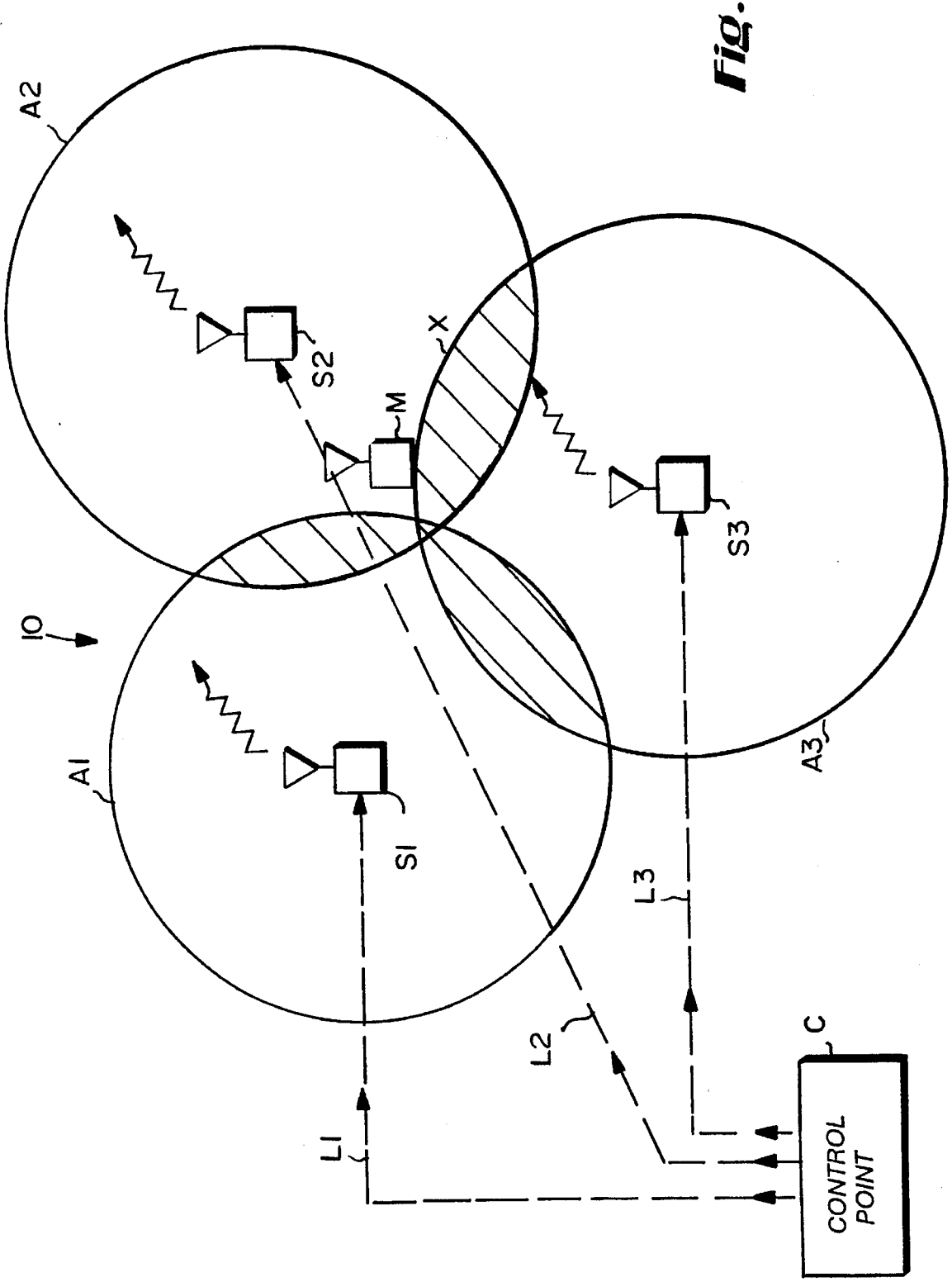

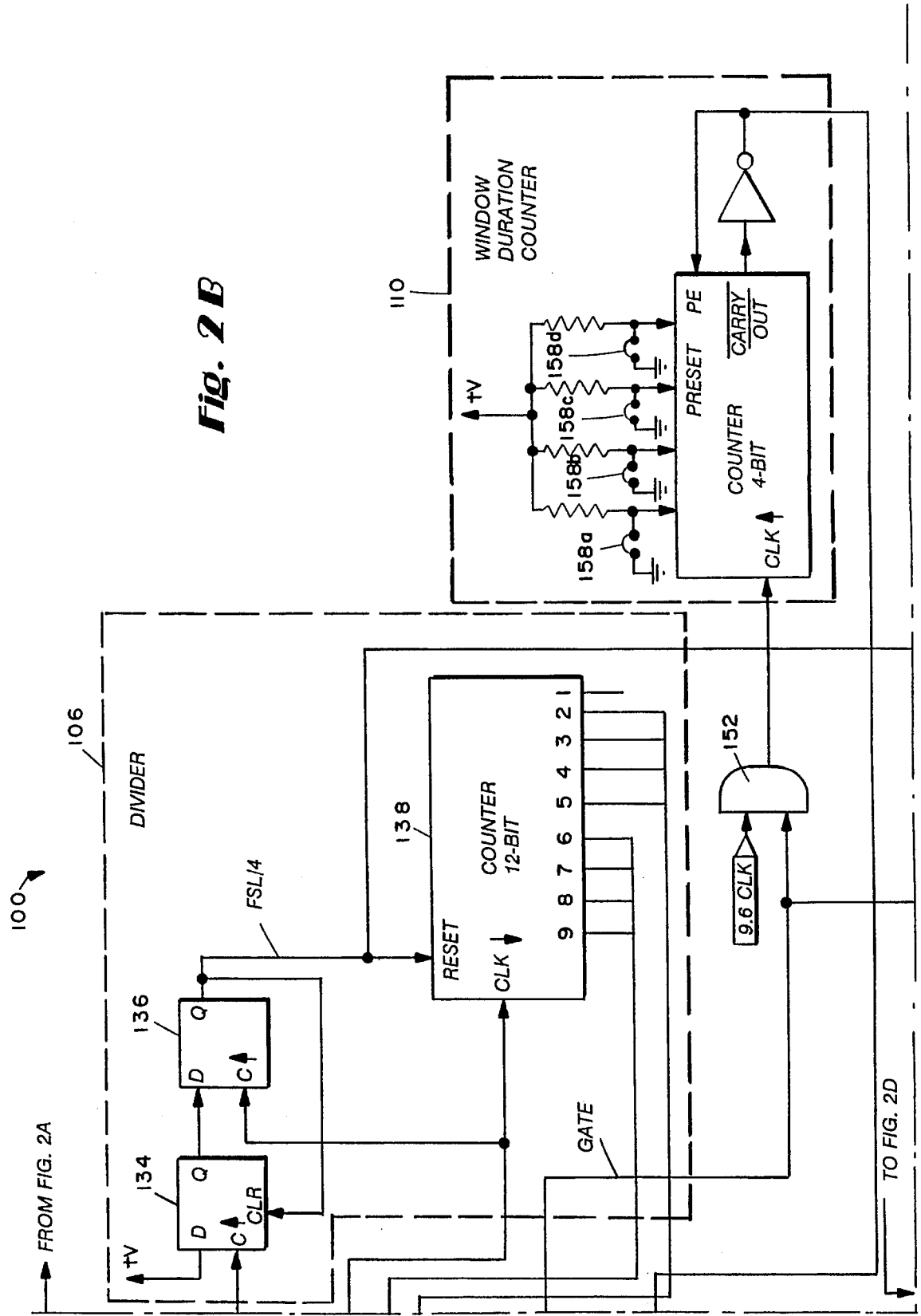

CONTROL CHANNEL TIMING DETECTION AND SELF CORRECTION FOR DIGITALLY TRUNKED SIMULCAST RADIO COMMUNICATIONS SYSTEM

This is a continuation of application Ser. No. 07/906,438, filed Jun. 30, 1992, now abandoned.

CROSS REFERENCES TO RELATED APPLICATIONS AND PATENTS

This application is related to copending commonly-assigned application Ser. No. 7/260,184 of Rose et al. filed 20 Oct. 1988, entitled "PUBLIC SERVICE TRUNKING SIMULCAST SYSTEM," which issued on Dec. 15, 1992 as U.S. Pat. No. 5,172,396 (Attorney Docket Number 46-122: Client Reference No. 45-MR-576). This application is also related to commonly-assigned copending application serial number 07/824,123 of Brown et al. entitled "SELF CORRECTION OF PST SIMULCAST SYSTEM TIMING", filed 22 Jan. 1992 (Attorney Docket Number 46-444: Client Reference No. 45-MR-664).

FIELD OF THE INVENTION

The present invention relates to radio communications, and more particularly to simulcasting of radio frequency transmissions from multiple transmission sites. Still more particularly, the present invention provides monitoring and self-correction of timing of trunking control (and other) signalling transmitted on the digital control channel of a digitally trunked simulcast type land-mobile radio frequency (RF) communications system.

BACKGROUND AND SUMMARY OF THE INVENTION

Due to FCC power limitations, geographical and other factors, it is sometimes not possible for a single RF transmitting site to provide adequate coverage to a large desired coverage area. For example, government entities commonly use land-mobile radio communications systems to provide communications between a headquarters and various mobile and portable radio users that rove throughout the jurisdiction of the governmental entity. In some cases the geographical area of jurisdiction is so large that it is not possible for a single land-based RF transmitting site to cover it. Even if the effective radiated power of the single transmission site was sufficiently great to cover the entire area, users in outlying or fringe areas might receive only spotty service because of the "line-of-site" nature of VHF transmissions and/or due to geographical obstructions (e.g., hills, bridges, buildings, and the curvature of the earth) interposed between the single transmitter site and various fringe locations within the coverage area.

One known way to expand the coverage area is to provide multiple, "simulcasting" transmitting sites. In order to simplify mobile radio operation and conserve radio frequency spectrum, such "simulcasting" RF transmitting sites all transmit substantially identical signals at substantially identical times on substantially identical radio frequencies. Such "simulcasting" eliminates control overhead and other complexities associated with performing "hand offs" from one RF transmitting site coverage area to another as is common, for example, in cellular and "multi-site" RF communications system. So-called "simulcasting" digitally trunked RF repeater systems are generally known. The following is a listing (which is by no means exhaustive) of prior documents that describe various aspects of RF transmission simulcasting and related issues:

U.S. Pat. No. 4,696,052 to Breeden;
U.S. Pat. No. 4,696,051 to Breeden;
U.S. Pat. No. 4,570,265 to Thro;
U.S. Pat. No. 4,516,269 to Krinock;
U.S. Pat. No. 4,475,246 to Batlivala et al.;
U.S. Pat. No. 4,317,220 to Martin;
U.S. Pat. No. 4,972,410 to Cohen et al.;
U.S. Pat. No. 4,903,321 to Hall et al.;
U.S. Pat. No. 4,608,699 to Batlivala et al.;
U.S. Pat. No. 4,918,437 to Jasinski et al.;
U.S. Pat. No. 4,578,815 to Persinotti;
U.S. Pat. No. 5,003,617 to Epsom et al.;
U.S. Pat. No. 4,939,746 to Childress;
U.S. Pat. No. 4,903,262 to Dissosway et al.;
U.S. Pat. No. 4,926,496 to Cole et al.;
U.S. Pat. No. 4,968,966 to Jasinski et al;
U.S. Pat. No. 3,902,161 to Kiowaski et al;
U.S. Pat. No. 4,218,654 to Ogawa et al;
U.S. Pat. No. 4,255,815 to Osborn;
U.S. Pat. No. 4,411,007 to Rodman et al;
U.S. Pat. No. 4,414,661 to Karlstrom;
U.S. Pat. No. 4,472,802 to Pin et al.;
U.S. Pat. No. 4,597,105 to Freeburg; and
Japanese Patent Disclosure No. 61-107826.

While simulcasting thus provides various advantages as compared to other techniques for expanding coverage area, it also introduces its own particular set of complexities that must be dealt with. By way of illustration, please refer to FIG. 1—which is a schematic diagram of an exemplary three-site simulcasting digitally trunked land-mobile RF communications system 10. System 10 includes three simulcasting transmitting sites, S1, S2 and S3. The transmissions of site S1 cover the coverage area A1, and similarly, the transmissions of sites S2 and S3 cover respective coverage areas A2, A3. A central control point C coupled to each of sites S1, S2 and S3 via a respective communications link (L1–L3) delivers, in real time, substantially identical signalling (including digital control channel signalling and associated timing information) for transmission by the various sites.

Exemplary system 10 is preferably a digitally trunked communications system of the type marketed by Ericsson-GE Mobile Communications Inc. under the trade name EDACS. This system provides a digital RF control channel and plural RF working channels. In such a digitally trunked system, an exemplary mobile radio unit M within one (or more) of coverage areas A1–A3 continuously monitors the "outbound" digital control channel when it is not actually engaged in active communications on a working channel with other units. Mobile M may request communications by transmitting a channel assignment request message on the "inbound" control channel. Upon receipt of such channel assignment request (and presuming that at least one working channel is available for temporary assignment to mobile unit M and the other units that mobile M wishes to communicate with), control point C responds by causing a trunking control channel assignment message to be transmitted by each site S1–S3 over the outbound control channel. In simulcast system 10, this channel assignment message is transmitted simultaneously by each of transmitting sites S1–S3 over the same outbound control channel frequency (such that mobile unit M and other mobile units "called" by the channel assignment message will receive the message regardless of which of coverage areas A1–A3 they may happen to be located within). Mobile unit M (and other called mobile units) respond to the received outbound trunking control channel assignment message by changing frequency to an RF working channel and conducting communications on the working channel. Once the working channel communications are concluded, the mobile unit M (and other called mobile units) return to monitoring the outbound control channel for additional messages directed to them.

Commonly assigned U.S. Pat. Nos. 4,905,302 and 4,939,746 provide additional detail regarding the exemplary trunking control process described above and also describe in detail the signals which are transmitted over the outbound control channel. Briefly, the outbound control channel signalling is "slotted" or "framed" with the different message slots being defined by synchronization signalling which is periodically transmitted over the outbound control channel. In preferred system 10, a dotting/Barker code sequence used for synchronization purposes recurs on the outbound control channel every 30 milliseconds. Message slots are defined between such recurring dotting/Barker synchronization signal transmissions. The timing of such dotting/Barker transmissions is set at control point C by a master time base frame synchronization link (FSL) signal. Control point C embeds such timing information into control channel signalling it sends to each of sites S1–S3 via respective links L1–L3.

Referring once again to FIG. 1, suppose mobile unit M is located within an overlap area X wherein coverage areas A2 and A3 overlap one another. Within this overlap area X, mobile unit M will receive (perhaps at approximately equal signal strength levels) the outbound control channel transmission of site S2 and also the outbound control channel transmission of site S3. Simulcast system 10 is appropriately designed such that such outbound control channel transmissions from sites S2 and S3 are on substantially the same RF frequency so that no heterodyning or other interference occurs. Similarly, control point C sends, over links L1–L3, substantially identical outbound control channel messages for transmission by each of sites S1–S3.

However, a problem can arise if the outbound control channels are not precisely synchronized to one another. A transceiver located within overlap region X that receives outbound control channel synchronization signals delayed with respect to one another by even a small time period (e.g., more than about 1-half bit period, or 52 microseconds for 9600 baud operation) could end up losing bits and/or temporarily losing synchronization, bit recovery and error checking capabilities.

Delays due to the limited speed at which electromagnetic waves propagate must be taken into account in systems simulcasting data at high data transmission rates (an RF signal travels "only" about 300 meters in one microsecond). It is possible (and usually necessary) to adjust the relative effective radiated power levels of the site transmitters so that the distances across the overlap regions X are kept less than a desired maximum distance—and thus, the difference in the RF propagation delay times across an overlap region due to the different RF path lengths between the site and a receiver within the overlap region is minimized. Even with this optimization, however, it has been found that (due to the additional differential delay caused by the different RF path lengths) a maximum system differential delay stability of ±5 microseconds must be observed to guarantee that the transceiver in any arbitrary location within a typical overlap region X will receive the corresponding digital signal bit edges within 52 microseconds of one another.

Fortunately, it is typically possible to minimize time delay differences to on the order of a microsecond through various known techniques. For example, it is well known in the art to introduce adjustable delay networks (and phase equalization networks) in line with some or all of links L1–L3 to compensate for inherent differential link delay times (see U.S. Pat. No. 4,516,269 to Krinock, and U.S. Pat. Nos. 4,696,051 and 4,696,052 to Breeden, for example). Typical conventional microwave link channels exhibit amplitude, phase and delay characteristics that are extremely stable over long periods of time (e.g., many months), so that such additional delays, once adjusted, guarantee that a common signal input into all of the links L1–L3 at the same time will arrive at the other ends of the links at almost exactly the same time. The same or additional delays can be used to compensate for different, constant delay times introduced by signal processing equipment at the sites S1–S3 to provide simultaneous coherent transmission of the signals by the different sites. For example, the above-identified Rose et al. patent application describes a technique wherein additional frequency and timing information is provided to each site over one or more additional channels in order to eliminate timing ambiguities that may result from the use of conventional multi-level, multi-phase protocol-type modems.

Even in well-designed simulcasting systems, however, various abnormal factors (e.g., electromagnetic noise and spikes resulting from lightning strikes and the like) can cause a properly operating simulcasting system to lose synchronization. A "hit" or outage effecting a particular data path and its associated modems may cause the timing to be reestablished at a "random" latency. Since the timing and location of these "hits" is not predictable and, moreover, may occur remotely from the control point C, it may be difficult to detect the timing fault, relay this information back to the control point, and initiate effective action.

In 1989, the assignee installed a control channel and working channel resynchronization arrangement in a customer's simulcast system. Such resynchronization arrangement acted to periodically reestablish data timing on the control channel and on working channels. In this simulcast system, the control channel ("CC") formerly carried a continuous data stream that did not provide "gaps" at every call which might be used for resynchronization purposes. The data stream did provide gaps periodically to provide a short time period (e.g., 11 milliseconds long) of all "1's" to periodically cause a resynch. This period is sufficiently brief and appropriately located so that the data framing is left intact; and is chosen to be placed in the data stream every certain time period (e.g., every 54 seconds).

Thus, it is known to resynchronize the control channel periodically (e.g., every 54 seconds) on a routine basis in order to correct any control channel timing errors that may arise in simulcast system 10. In addition, the above-identified U.S. patent application Ser. No. 07/824,123 filed Jan. 22, 1992 in the name of the present applicant describes additional techniques (which have been in public use for more than a year and are therefore prior art to the present application) for periodically "kicking" a modem in order to ensure that the modem uses a distributed common clocking signal; and for retraining a communications link and associated modems for a simulcast system working channel if a routinely performed working channel "test call" fails.

Thus, actual "over-the-air" monitoring has been successfully used in the prior art to periodically test working channel timing using the "test call" technique. Unfortunately, the prior art "test call" approach described in copending application Ser. No. 07/824,123 cannot be used for testing control channel synchronization because the control channel is always in use and cannot conveniently be temporarily taken out of service for testing—and because such "test calls" in exemplary system 10 make use of a local test transceiver that is itself synchronized with the locally transmitted outbound control channel and has no other timing reference. See U.S. Pat. No. 4,903,321 to Hall et al. Thus, although such an exemplary "test call" transceiver can test working channel timing relative to the control channel, it is incapable of comparing control channel timing to any other timing reference. While periodic resynchronization of the control channel every minute or so as described above will (absent some failure more fundamental non-momentary timing malfunction) successfully resynchronize control channel timing of all simulcast sites S1–S3 relative to one another, it has not in the past been possible (due to the fact that the control channel continuously carries messaging traffic) to monitor over-the-air control channel signalling to provide such resynchronization when actually needed. Loss of relative timing synchronization between the control channels of two or more simulcast sites S1–S3 for even a few seconds may cause mobile units M in overlap areas to temporarily lose contact—a condition which is annoying and may also lead to missed calls. Thus, a still more reliable mechanism for continuously ensuring control channel timing synchronization within a digitally trunked simulcast RF communications repeater system would be highly desirable.

The present invention provides highly reliable continuous common point control channel timing detection and correction within a simulcast system. In accordance with one aspect provided by the present invention, a control channel timing monitor receives control channel timing signals transmitted over-the-air on the outbound control channel by each of the simulcasting transmitting sites. The control channel monitor extracts timing information from each of the monitored signals, and analyzes such timing information to determine relative and/or absolute synchronization.

In one preferred embodiment, the extracted timing information is compared to a system-wide master timing reference (this master timing reference available at the control point is used to synchronize all signals provided to simulcasting transmission sites S1–S3). The monitor provides a delay of reference timing relative to the received monitored control channel signalling in order to compensate for inherent system delays. An alarm is generated if the comparison indicates that control channel timing of any of the simulcasting transmission sites is not synchronized with the master timing reference. Corrective action may be immediately taken in response to the alarm.

In accordance with a further aspect provided by the present invention, corrective action may include sending a command to the simulcast control site that causes system 50 to take the faulty control channel out of service as a control channel and substitute a working channel frequency and associated equipment for the control channel equipment. Such shifting of the control channel to a different frequency is accomplished very rapidly in preferred system 50 in accordance with known techniques described, for example, in commonly assigned patent application Ser. No. 07/532,164 filed Jun. 5, 1990 entitled FAIL-SOFT ARCHITECTURE FOR PUBLIC TRUNKING SYSTEM (attorney reference number 46-72: Client reference number 45-MR-541). In accordance with this aspect provided by the present invention, the hardware formerly operating on the control channel is left in service as a working channel, and a "test call" may be directed to that working channel (as described in application Ser. No. 07/824,123). Such "test call" will, if it fails, cause retraining of the associated communication link and modems as described in application Ser. No. 07/824,123 (thereby possibly resolving the loss of synchronization problem)—or the channel will be taken out of service entirely if a more severe failure mode is present.

BRIEF DESCRIPTION OF THE DRAWINGS

These and other features and advantages provided by the present invention will be better and more completely understood by referring to the following detailed description of presently preferred exemplary embodiments in conjunction with the drawings, of which:

FIG. 1 is a schematic illustration of a presently preferred simulcast system 10;

FIG. 2A–2D together are a detailed schematic circuit diagram of a first presently preferred exemplary embodiment of a control channel timing monitor provided by the present invention;

DETAILED DESCRIPTION OF PRESENTLY PREFERRED EXEMPLARY EMBODIMENTS

Figure 2A:
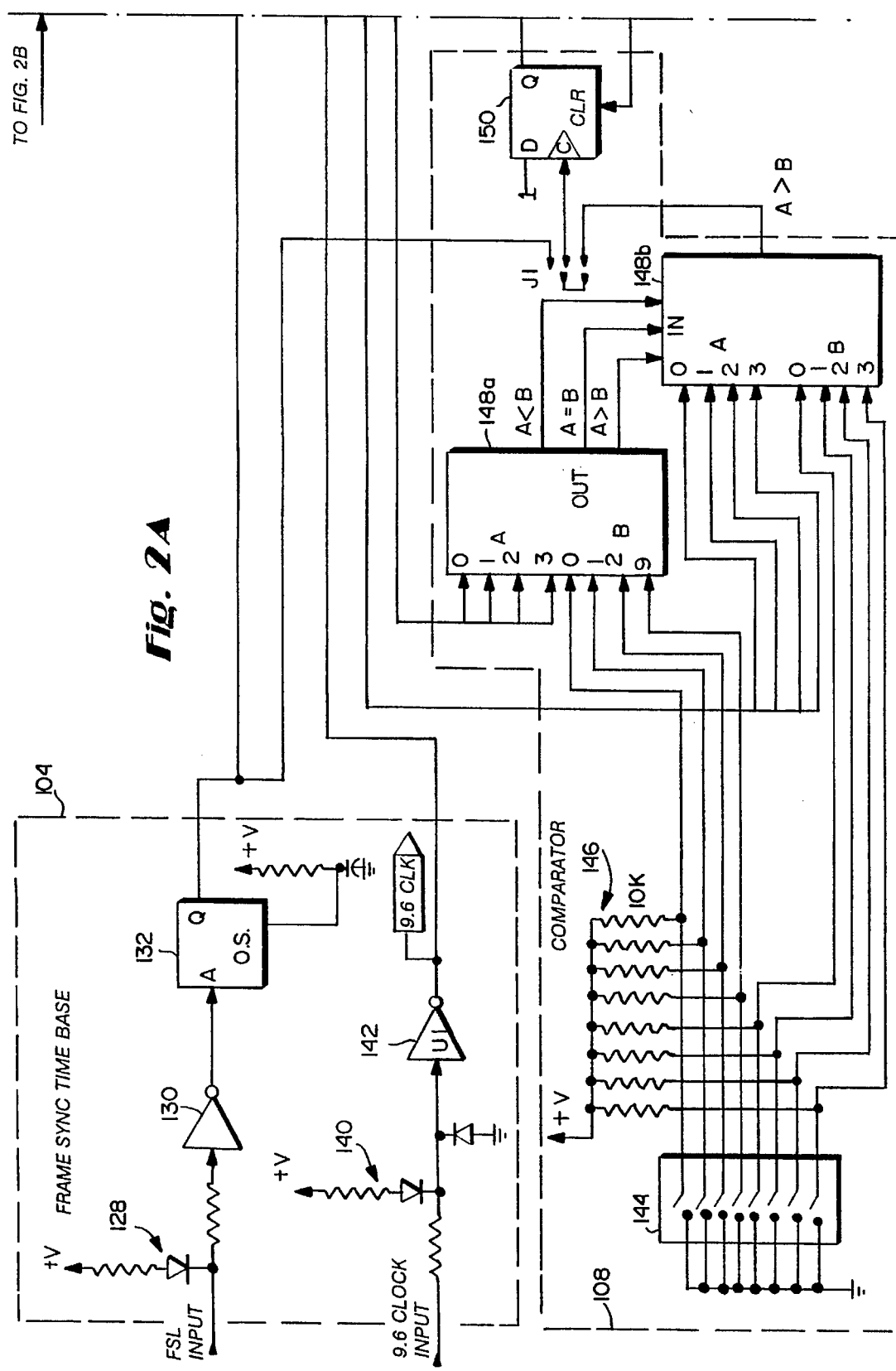

FIGS. 2A–2D together are a detailed schematic diagram of a first presently preferred exemplary embodiment of a simulcast control channel timing monitor 100 provided by the present invention. Monitor 100 includes control channel monitoring RF receivers 101 and associated directional antennas (one for each simulcasting transmitting site within system 10 in the preferred embodiment); and further includes associated corresponding signal receivers 102 (one for each site). System 100 further includes a time base 104; time base interval timer 106; a programmable digital value magnitude comparator 108; a further counter 110; and timing comparator/fault indicators 112 (one for each site in the preferred embodiment).

Briefly, each RF receiver 101 and associated signal receiver 102 receives control channel signals monitored off the air from the outbound control channel of an associated transmitting site (S1–S3 shown in FIG. 1). Although the described system includes only three transmitting sites S1–S3, it will be understood that any number of transmitting sites could be accommodated by simply providing additional signal receiver blocks 101, 102 and comparator/fault indicator blocks 112). RF receivers 101 may be located remotely to at least some of the transmitting sites so as to monitor signals transmitted by each of the transmitting sites using, for example, directional antennas (so as to distinguish between the outbound control channel signals that are transmitted by each of the various sites). Alternatively, it may be possible (so long as additional inherent delays are compensated for) to locate receiver 101 at its associated site, and to then provide monitored signalling to monitor 100 via microwave link or the like. There is thus a one-to-one correspondence in the preferred embodiment between RF receivers 101(1)–101(3) and sites S1–S3, with each RF receiver continuously monitoring the outbound control channel signalling transmitted over the air by an associated transmitting site. Each such RF receiver 101 in the preferred embodiment may comprise a conventional mobile transceiver modified to generate a digital pulse output each time the receiver receives and decodes the digital dotting/Barker word synchronization signals received on the outbound control channel.

As mentioned above, exemplary system 10 control channel signalling provides dotting and a Barker code for synchronization once every frame (i.e., once every 30 milliseconds). Control channel monitoring RF receivers 101 respond to receipt of such dotting/Barker word by generating a digital pulse which is then processed by associated signal receiver 102. Thus, each of signal receivers 102 produces an output pulse for each frame of the associated site control channel—with the time the signal receiver produces the output pulse being responsive to the time at which the dotting and Barker word appear on the outbound RF control channel of the associated site.

Each signal receiver block 102 includes conventional clamping circuitry 114 and buffer 116 to provide level stabilization and isolation. The output of buffer 116 is provided within each of signal receiver blocks 102 to a conventional "one-shot" (monostable multivibrator circuit) 118 that generates a pulse having a predetermined width in response to receipt of a pulse from buffer 116. The pulse width output provided by one-shot 118 in the preferred embodiment is set by RC network 120 (which may have values of, for example, R=22 kilohms and C=0.1 microfarads). The output of one-shot 118 is used to clock a "one" input into D flip-flop 122. The Q output of flip-flop 122 is provided to the D input of a further flip-flop 124. Flip-flop 124 synchronizes the Q output of flip-flop 122 to a 9.6 kilobaud system clock signal (which clock signal is provided in the preferred embodiment via time base 104). The Q output of flip-flop 124 is provided to the "CLR" input of flip-flop 122 so as to clear the flip-flop 122 in preparation for receipt of the next pulse from RF receiver 101.

Each RF receiver 101 and each signal receiver 102 introduces additional delay inherent in the processing of such received control channel synchronization signals. However, because preferred embodiment RF receivers 101 are all identical to one another and signal receivers 102 are similarly all preferably identical to one another, uniform delay is introduced into each of the signal receiver outputs such that no differential delay is introduced between the signal processing circuitry for the various sites. Although not necessary, it may be desirable in some applications to provide additional optional adjustable delays 126 in order to compensate for differential delays introduced due to different communication path lengths (e.g., different free space path link lengths between sites S1–S3 and associated RF receivers 102(1)–102(3) if the receivers are located remotely from the sites; or differences in microwave path links L1–L3 if the RF receivers 101 are located at the corresponding transmitter sites S1–S3).

If the control channel timing of each of sites S1–S3 is substantially identical, then signal receivers 102(1)–102(3) will all substantially simultaneously produce periodically-occurring digital pulse outputs. Because outbound control channel relative time synchronization between the various sites S1–S3 (rather than absolute time synchronization) is what is important in simulcast system 10, it is possible to compare the timing of the three signal receiver 102 outputs and generate a false indication if any signal receiver output differs substantially in timing from any other signal receiver output. The preferred embodiment is capable of making this comparison (i.e., by obtaining the "FSL" reference signal from an additional RF receiver 101 monitoring a "reference" site outbound control channel), but may alternatively compare the output of each signal receiver 102 to a periodically recurring system-wide frame synchronization clocking reference signal that provides frame synchronization for the entire system. If the outbound control channel signalling of each of sites S1–S3 is synchronized with an absolute time base, then the signalling of the different sites must also be synchronized relative to one another.

In the preferred embodiment, time base block 104 is connected to receive a periodically recurring "FSL" frame synchronization signal at its "FSL input" line. This frame synchronization signal may be obtained, for example, from a master crystal-controlled time base that serves to synchronize frame timing for all signalling provided by control point C to each of sites S1–S3. In the preferred embodiment, time base block 104 clamps (with clamping circuit 128) and buffers (with buffer 130) the FSL signal before providing it to one-shot 132. One-shot 132 provides a pulsed output (with predetermined pulse width) at the output of time base 104 upon receipt of each frame synchronization pulse from the FSL input line. The output of time base 104 is provided to interval timer block 106, which in the preferred embodiment includes cascaded flip-flops 134, 136 to synchronize the FSL pulses with the 9.6 kilobaud system clock provided by time base block 104 (so that the output of flip-flop 136 is synchronized to the same clock as are the outputs of flip-flop 124).

Counter 138 and magnitude comparator block 108 introduce a delay between the occurrence of an FSL pulse and the opening of a "window" during which monitor 100 is sensitive to the outputs of signal receivers 102. More detail about the nature and function of this window will be provided shortly. Within interval timer 106, the synchronized FSL output is provided to the reset input of a twelve-bit counter 138 the clock input of which is also connected to receive the buffered 9.6 kilobaud system clock via a further clamping circuit 140 and associated buffer 142 (this 9.6 kilobaud clock may be the same clock that sets the bit rate for transmitting signals over the outbound control and working channels). Counter 138 counts the higher frequency 9.6 kilobaud system clock pulses, and resets this count upon the occurrence of every system-wide outbound control channel frame (as indicated by the FSL signal) in the preferred embodiment.

Magnitude comparator block 108 compares the output of counter 138 with a programmed digital value, and produces an output signal when counter 138 reaches that programmed value. In the preferred embodiment, the programmed digital value is eight bits wide, is set by a user programmable DIP switch 144, and is generated by the DIP switch in conjunction with pull-up resistors 146. This programmed digital value is applied to the "B" input of an eight-bit magnitude comparator 148 (two four-bit magnitude comparators coupled together in parallel are used to provide 8-bit comparison capabilities). Eight bits of twelve-bit counter 138 (the least significant bit and the three most significant bits of the counter are discarded in the preferred embodiment) are applied to the "A" input of magnitude comparator 148.

Magnitude comparator 148 produces an output whenever the output of counter 138 exceeds the programmed digital value. This output is used to clock flip-flop 150 in the preferred embodiment to generate a GATE signal. This GATE signal is applied to AND gates 154 within each of comparator/fault indicators 112 so as to gate the outputs of signal receivers 102 to the "reset" inputs of associated counters 156. The GATE signal is also applied to one input of an AND gate 152 so as to permit 9.6 kilobaud system clock pulses to clock counter 110. Counter 110 comprises, in the preferred embodiment, a presettable four-bit counter (clocked as mentioned above, by the 9.6 kilobaud system clock via AND gate 152) that serves as a programmable interval timer for controlling the duration of the window mentioned above. A four-bit preset value may be programmed via jumpers 158 in the preferred embodiment. Each time counter 110 produces a "carry out" signal, the programmable preset value is preset into the counter and an output signal is applied to clear flip-flop 150 within comparator 108 (thereby removing the GATE signal). Counter 110 thus establishes a duration over which the GATE signal is active.

As mentioned above, the GATE signal is used to selectively gate, via AND gate 154, the outputs of respective signal receivers 102 to the reset input of counters 156. Counters 156 are clocked by the 9.6 kilobaud system clock so as to continually count until reset by the outputs of associated AND gates 154. Counters 156 in the preferred embodiment comprise twelve-bit counters, with the most significant bit output Q12 being provided via buffer 160 and clamping circuit 162 as a "fault" indicating output for the respective one of sites S1–S3.

Figure 2C:
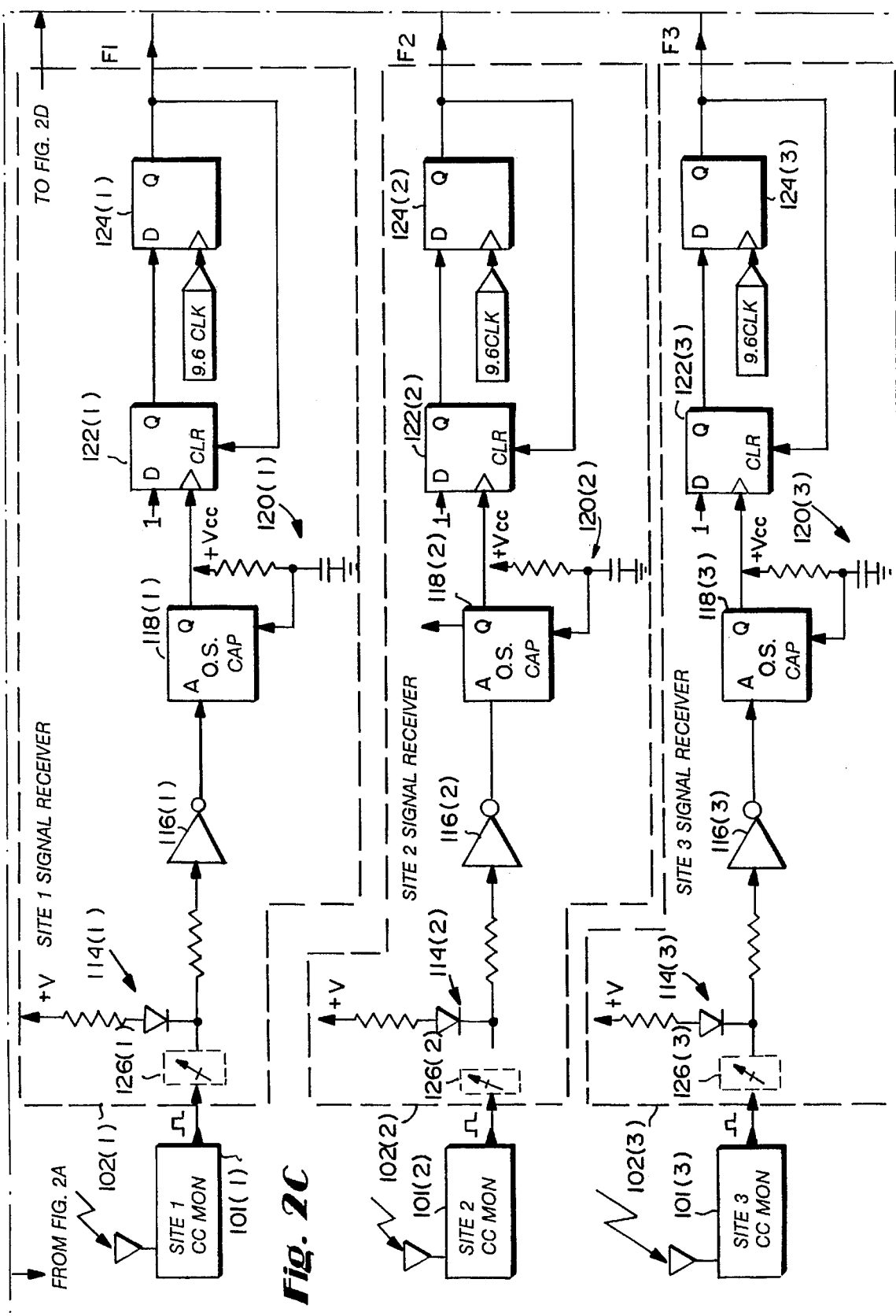
Figure 2D:
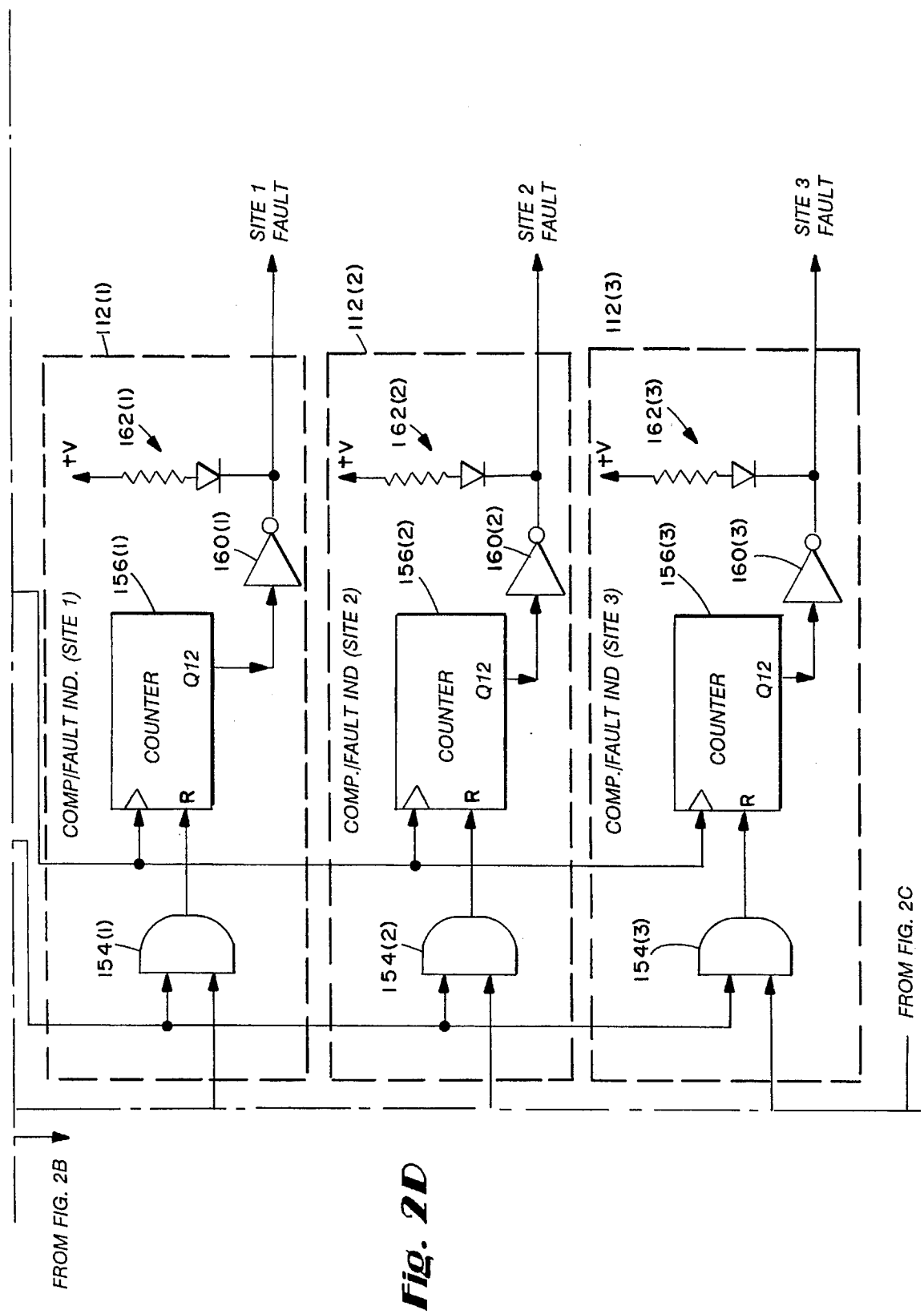
Figure 3:
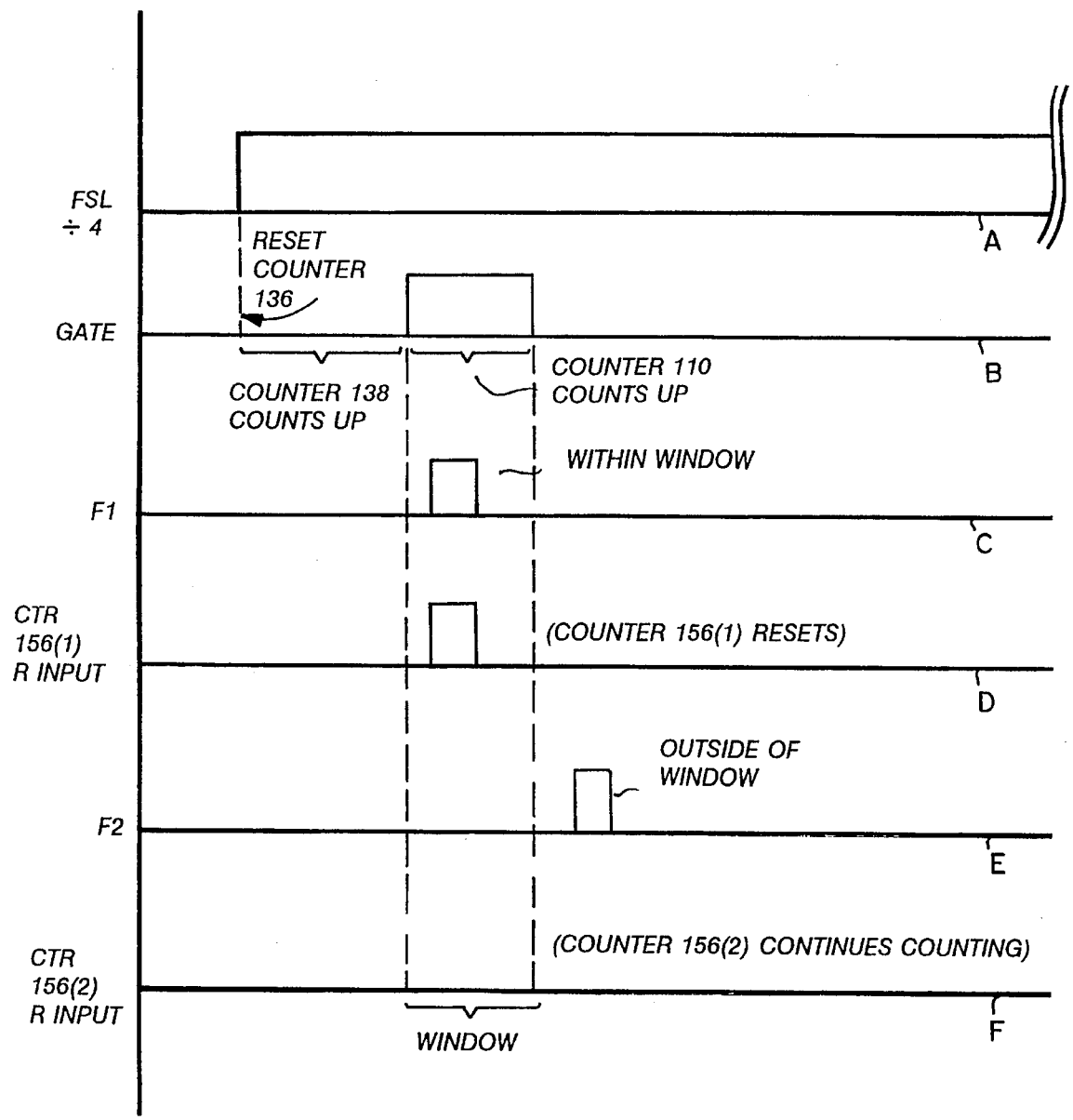
FIG. 3 is an exemplary timing diagram showing certain timing signals present within the embodiment shown in FIGS. 2A–2D.

The operation of the embodiment shown in FIGS. 2A–2D will now be described in connection with FIG. 3.

Time base 104 continuously receives the 9.6 kilobaud system-wide clock input and continually applies that input to 12-bit counter 138 so as to increment the count contained within the counter. Counter 138 is reset once every system-wide frame in response to the synchronized FSL signal provided by flip-flops 134, 136. Upon being reset (see FIG. 3 line A), counter 138 begins counting the 9.6 kilobaud clock pulses—thus timing a time interval beginning at the active edge of FSL. This delay is needed in some installations to compensate for system propagation delay occurring from the time the FSL system reference signal becomes active to the time the RF receivers 101 receive and process the corresponding dotting/Barker signals transmitted by sites S1–S3 over the outbound control channel, and travel over free space to receivers 101). When counter 138 has counted to in excess of the value programmed into DIP switch 144, magnitude comparator 108 begins producing the GATE signal (see FIG. 3 line B) so as to open the "window" during which comparator/fault indicators 112 are sensitive to the frame occurrence signals produced by signal receivers 102 in response to outbound control channels signals received from sites S1–S3 by RF receivers 101.

As mentioned above, the duration of the GATE window is controlled by the preset values programmed via jumpers 108 at the inputs of counter 110. This counter 110 "closes" the "window" when it generates a "carry out" signal (see FIG. 3 line B).

Meanwhile, counters 156 increment their count upon receipt of each frame synchronization signal from flip-flop 136 in the preferred embodiment. If proper synchronization is maintained between the frame timing of the outbound control channel of respective sites S1–S3 and the system-wide frame synchronization FSL signal applied to time base 104, then signal receivers 102 will always produce outputs within the time window opened by comparator 108 and closed by window duration counter 110—thus resetting associated counter 156 via AND gate 154 (see FIG. 3 lines "C" and "D"). If, on the other hand, one of sites S has an outbound control channel timing which is not in sufficiently close synchronization with the FSL master frame synchronization timing, the output of associated signal receiver 102 will occur outside of the time window (i.e., during a time when the GATE signal is not active; see FIG. 3 line "E") and thus will not be passed by associated AND gate 15 to reset associated counter 156. Thus, instead of being continually reset, counter 156 (see FIG. 3 line "F") will steadily increment its count in response to the occurrence of FSL master frame synchronization signals so as to eventually cause (after a sufficient number of frames have occurred without counter reset) the counter Q12 output to become active—thereby generating a site-specific fault indication.

Counter 156 thus, in the preferred embodiment, provides an integrating function so that spurious faults are not indicated due, for example, to signal fading or other temporary signal loss by monitor 100). The value that counter 156 must count up to before an output is generated may be selected on an empirical basis to provide sufficient error integration while also providing sufficiently rapid response time so as to ensure rapid fault detection.

Referring once again to FIG. 2A, it will be seen that a jumper $J_1$ may be used to connect the clock input of flip-flop 150 directly to the output of one-shot 132. The effect of placing jumper J1 in this position is to effectively remove interval timer 138 from the circuit—so that the time window discussed previously begins immediately upon generation of each FSL master frame synchronization signal. This connection may be used, for example, if the FSL signal input is provided by the output of a control channel monitoring receiver 101 monitoring the outbound control channel of a reference site (in such installations, there is no large inherent differential processing time delay as discussed above. Note that the clock rate and counter size are related, and can be chosen to achieve any desired timing precision.

Figure 4:
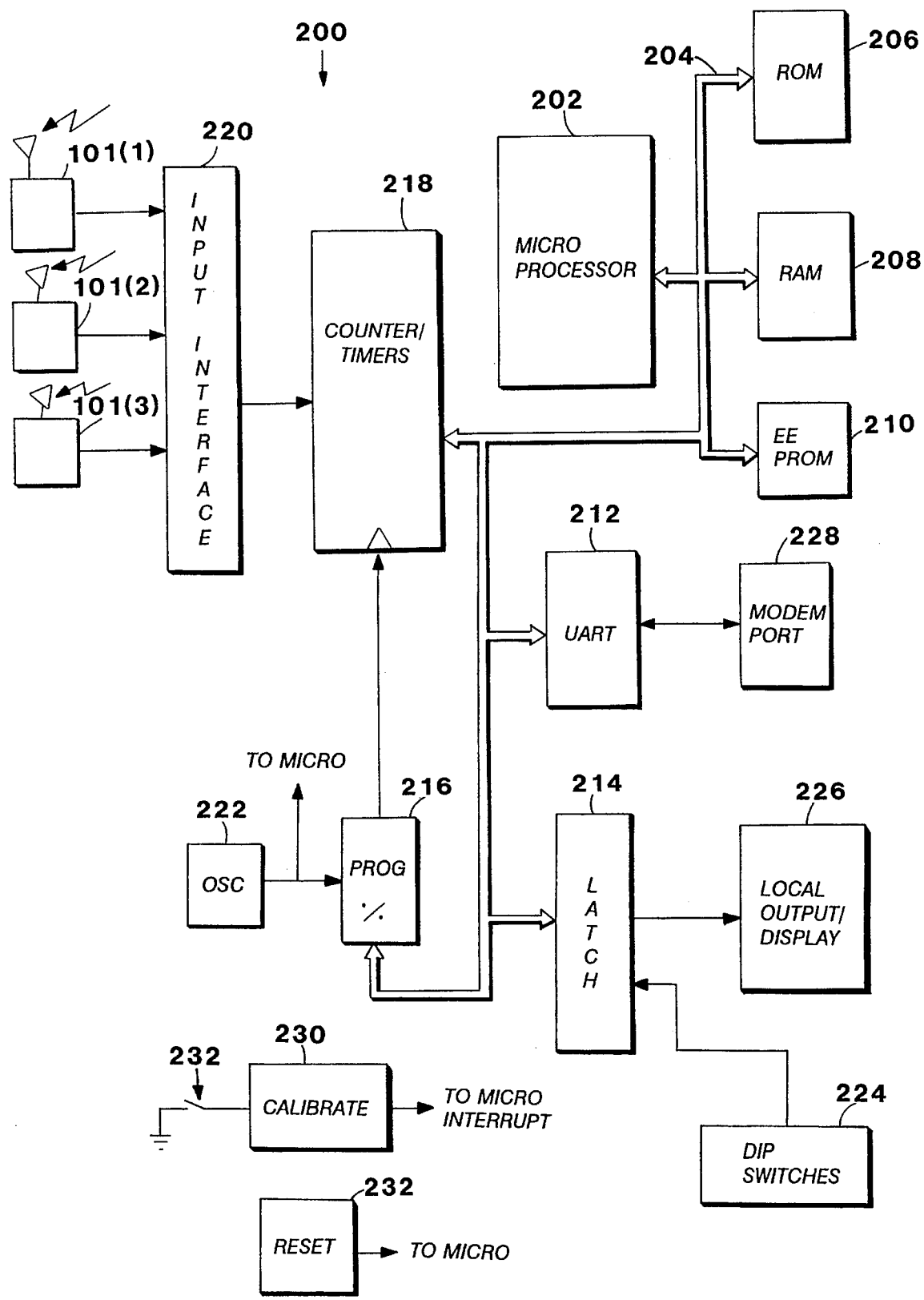
FIG. 4 is a schematic diagram of a further, microprocessor-based presently preferred exemplary embodiment control channel timing monitor provided by the present invention.

FIG. 4 is a simplified schematic block diagram of a further, microprocessor-based embodiment of a control channel timing monitor 200 provided by the present invention. A microprocessor 202 is coupled in a conventional manner via bus 204 to read only memory (ROM) 206, random access memory (RAM) 208, EEPROM 210, UART (universal asynchronous receiver/transmitter) 212, latch 214, programmable divider 216, and counter/timers 218. ROM 206 stores program control instructions for execution by microprocessor 202. RAM 208 provides writable memory locations for use by microprocessor 202 while it is executing, and non-volatile EEPROM 210 is used primarily for storage of calibration information in the preferred embodiment (as will be explained). Microprocessor 202 executes routines for calibration, timing monitoring, counter/time control, and communication through UART 212 as will be explained in connection with FIGS. 5–7.

Counter/timers 218 are controlled by microprocessor 202 via bus 204, and act to precisely (with a precision determined by set-up and clock reference values) measure the time between receipt of inputs provided via a user interface 220. User interface 220 in the preferred embodiment is connected to receive signals from RF receivers 101(1)–101(3) monitoring respective sites S1–S3 as shown in FIG. 2C. User interface 220 includes circuitry on each input providing a single pulse for each site input (with the starting edge of the pulse being a direct function of the corresponding site control channel frame timing).

An oscillator 222 generates a high frequency clock (e.g., 10 megahertz or higher) for microprocessor 202, and is also coupled to the input of programmable divider 216. Programmable divider 216 divides the rate of the clock signal provided by oscillator 222 by a divider that is set by microprocessor 202, and provides the divided rate clock signal to a clocking input of counter/timers 218. Since programmable divider 216 is programmable in response to data received from microprocessor 202, the microprocessor can directly control the rate (precision) of the counting operation performed by counter/timers 218.

A latch 214 provides an interface to programmable DIP switches 224 (i.e., to permit local manual programming of certain parameters of monitor 200) and also may provide outputs to local output/display 226 (which in the preferred embodiment may comprise LEDs and associated drivers to provide a local display of faults).

UART 212 is coupled to a conventional modem port 228 so as to permit microprocessor 202 to communicate with external devices (e.g., a central controller) via a conventional telephone line or other convenient link. A "calibrate" block 230 and associated momentary-on switch 232 provide momentary switch closure and debounce to locally initiate timing calibration (this switching function may also be remotely activated if desired). Depression of the momentary on calibration switch 232 causes monitor 200 to acquire the present relative timing of the inputs and store this as the "correct reference" timing. Reset block 232 provides an automatic power-reset, and may also provide a momentary-on manually-depressible switch for initiating a reset of monitor 200.

Figure 5:
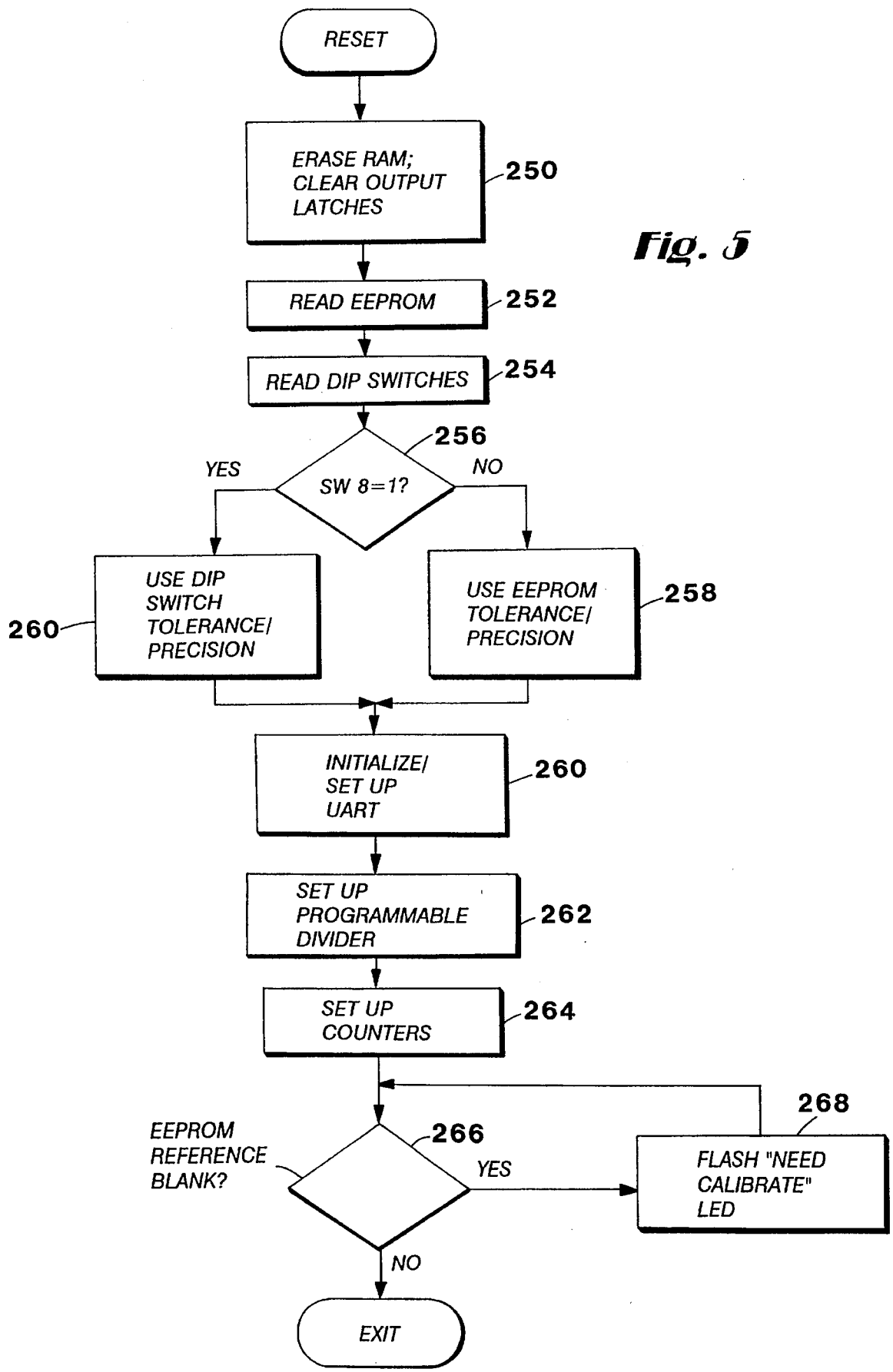
FIGS. 5–7 are schematic flow charts showing exemplary program control steps performed by the embodiment shown in FIG. 4.

FIG. 5 is a schematic flowchart of exemplary program control steps performed by microprocessor 202 upon a power on (or manual) reset. Microprocessor 202 first erases RAM 208 and then clears output latch 214 (block 250). Microprocessor 202 then reads the contents of EEPROM 210 and DIP switches 224, and stores those contents into appropriate locations within RAM 208 for later reference (blocks 252, 254). Microprocessor 202 then tests a predetermined bit of DIP switch 224 (decision block 256) to determine whether it should use tolerance/decision data stored within EEPROM 210 (block 258) or whether it should instead use values programmed manually via DIP switches 224 (block 260). DIP switches 224 in the preferred embodiment thus provide a "manual override" function so as to permit local manual programming of the default tolerance and precision data stored within EEPROM 210.

Microprocessor 202 subsequently initializes and sets up UART 212 (block 260), sets up programmable interval timer 216 (i.e., by writing appropriate values obtained from one of blocks 260, 258) (block 262), and then sets up counter/timers 218 (block 264) (similarly by using appropriate values obtained via blocks 258 or 260).

Microprocessor 202 next tests the contents of RAM 208 to determine whether a relative timing value used as a reference for monitoring was obtained from EEPROM 210 by block 252 (decision block 266). If no reference timing values were obtained from EEPROM 210, then microprocessor 202 writes alternating "1" and "0" values to latch 214 so as to "flash" local output/display 226 to indicate a need for calibration (block 268). Microprocessor 202 will continually loop in this fashion until the user depresses the calibrate switch 232 so as to provide a "calibrate" interrupt that causes the microprocessor to execute the calibration routine shown in FIG. 6. If, on the other hand, appropriate reference data was read from EEPROM 210 by block 252, the reset routine exits to the main routine shown in FIG. 7.

Figure 6:
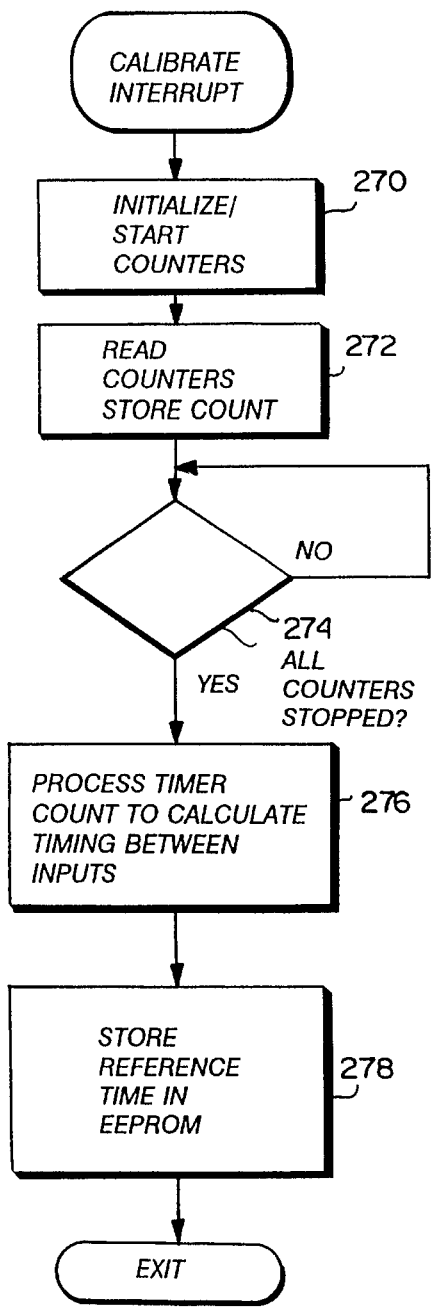

Referring now to FIG. 6, the calibrate interrupt routine is executed whenever a user manually depresses calibrate switch 232. In the preferred embodiment, the counter/timer block 218 includes a counter for each of sites S1–S3 (and, if monitor 200 is located at control point C, it may also include a counter for the FSL master time base input). Such counters are programmable and may function as either an "up" counter or as a "one shot" in the preferred embodiment. Microprocessor 202 programs a "reference" counter to act as a one shot, and programs the other counters to function as up counters in the preferred embodiment. The counters count up from zero at the rate of the divided-down clock pulses provided by programmable divider 216. The counters begin counting up at the command of microprocessor 202, and stop counting upon receipt of a pulse outputted by associated RF receiver 101 via input interface 220.

The calibrate routine first initializes and starts all of the counters within counter/timers block 218 (block 270), and then continually reads the counters and stores their associated counts (block 272). Once all counters have stopped (as tested for by decision block 274), microprocessor 202 compares the values it has read to calculate the relative timing between receipt of frame timing indication outputs provided by receivers 101 (and the FSL signal if this signal is connected). So long as the calibration routine is executed during normal system operation when all of the site outbound control channels are substantially exactly synchronized with one another, block 276 performed in the course of the calibration routine will automatically obtain system reference data indicating "normal" timing differences between the various inputs to input interface 220 that are attributable to differential time delays inherent in the monitoring process (e.g., differential path links and the like as discussed above).

The microprocessor 202 also determines which input is "earliest" and uses this input as the timing reference. Under normal system operation when all sites are in substantial synchronization with one another, the inherent time delays associated with the monitoring process will always cause one of the three receiver 101 outputs to become active prior to the other two receiver outputs. If the system-wide FSL time base is included as one of the inputs to input interface 220, then microprocessor 202 will typically determine this signal to be the earliest. Reference data indicating differential delay between the reference input and each of the other inputs is obtained from the stopped counter values and stored in EEPROM 210 (block 278).

Thus, the Figure embodiment automatically accommodates either a system-wide FSL time base or an RF receiver 101 output as a reference input without any need for manually setting a jumper or other programming. Moreover, the FIG. 4 embodiment automatically selects a reference from among the input signals provided to it, and automatically compensates if necessary for inherent processing time delays between generation of an FSL time base reference and receipt of corresponding frame synchronization signals from the dotting/Barker pattern by receivers 101.

Figure 7:
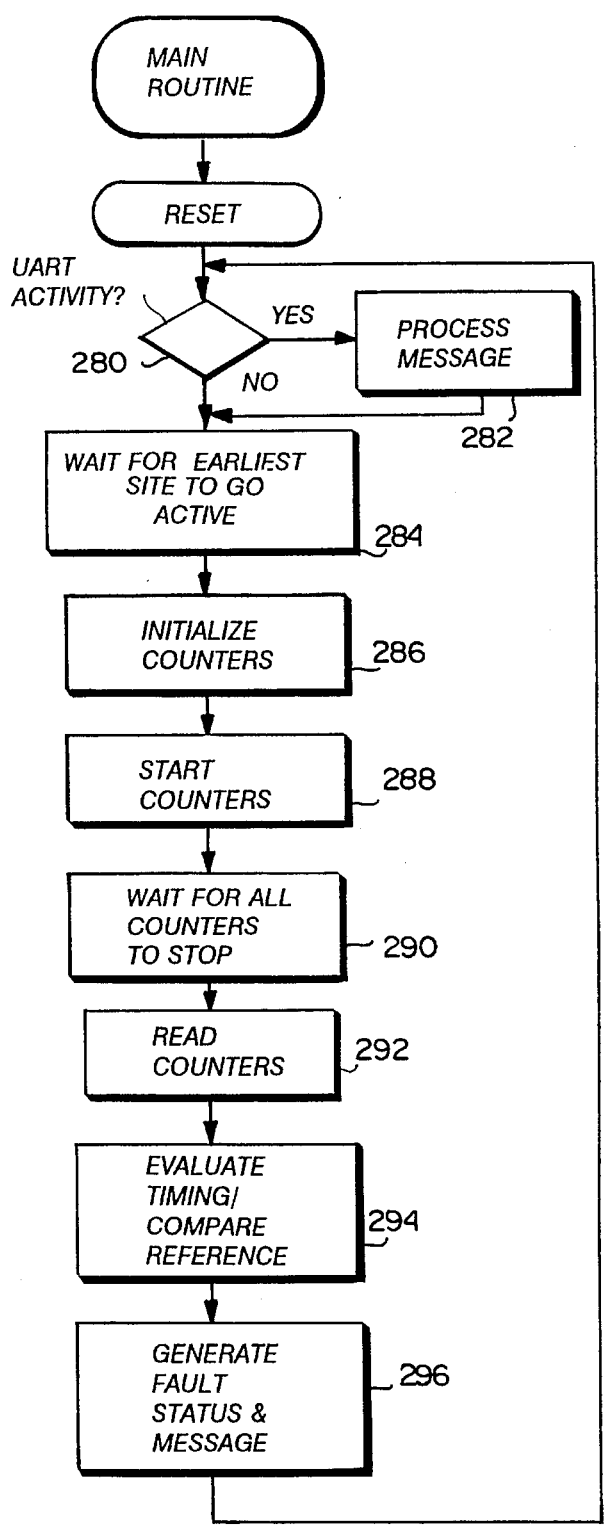

The main monitoring routine executed by microprocessor 202 is schematically shown in FIG. 7. Subsequent to reset (and assuming that calibration has already been performed), microprocessor 202 tests for messages received via modem 276 and UART 212 (decision block 280) and processes any such received messages (block 282). Microprocessor 202 has already initialized as a "one shot" the programmable counter within counter/timer 218 corresponding to the "earliest" (i.e., reference) input (as indicated by the calibration data stored in EEPROM 210) to input interface 220. Microprocessor 202 waits for occurrence of the one shot output corresponding to the "earliest" site to become active (block 284). Once microprocessor 202 detects that the "earliest" site output has become active, the microprocessor initializes the counters in the count up mode (block 286), and then enables the counters to count (block 288). Each of the counters begins to count, and stops counting when its associated receiver 101 has produced an output indicating that a frame synchronization word has occurred on the corresponding site outbound control channel. Microprocessor 202 then waits for all of the counters to stop counting (block 290). At this point, microprocessor 202 reads all counters (block 292) and evaluates the read data using the reference data stored within EEPROM 210 (block 294). If one of the counters stores a value that is significantly different (i.e., outside of a preprogrammed tolerance from) the calibration-obtained data, microprocessor 202 generates a fault indication (block 296)—preferably by writing appropriate data to latch 214 so as illuminate one or more appropriate LEDs to indicate the particular site the timing of which has failed, and also by sending an appropriate digital fault message via UART 212 and modem 228 that designates the failed site. In response to receipt of such a fault message, central point C may preferably take corrective action, such as, for example "bringing down" the control channel and transferring the control channel functions to a frequency that formerly operated as a working channel.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a simulcast radio frequency (RF) communications system that simulcasts the same signals from at least first and second RF transmission sites to portable or mobile radio transceivers over a same outbound RF control channel and same RF working channels specified by digital trunking control signals simulcasted over the same outbound RF control channel which are divided into a continuous series of frames with each frame having a synchronization portion including repetitive synchronization signals for obtaining frame and bit synchronization and a message port, ion including a digital thinking control message, wherein at least one of said radio transceivers obtains frame and bit synchronization with said first RF transmission site using the repetitive synchronization signals transmitted over said outbound RF control channel by said first transmission site, a control channel timing monitoring system, comprising:

an RF receiver other than said radio transceiver and corresponding to said first RF transmission site that receives said series of frames transmitted over said outbound RF control channel by said first RF transmission site and generates a first pulse timing signal base detection of said repetitive synchronization signals included in each frame;

a reference timer for providing a reference timing signal; and a fault detector, connected to receive said reference timing signal and said first pulse timing signal, for determining whether said first pulse timing signal is synchronized to a least within a predetermined tolerance with said reference timing signal and for generating a fault indication if said determination reveals that said first pulse timing signal is not synchronized with said reference timing signal to at least within said predetermined tolerance.

2. The control channel timing monitoring system as in claim 1, further comprising: a further radio receiver that receives said series of frames, along with the repetitive synchronization signals included in each frame, transmitted on said outbound RF control channel by said second RF transmission site and generates a further pulse timing signal based on a predetermined timing specified by said repetitive synchronization signals received by said further radio receiver, and said fault detector is connected to receive said further pulse timing signal and produces said fault indication when said further pulse timing signal is not synchronized with said reference timing signal to at least within said predetermined tolerance.

3. The control channel timing monitoring system as in claim 1 wherein said reference timer comprises a time base providing a timing for frame synchronization of said simulcast system, and said fault detector provides the fault indication when the timing of said first pulse timing signal differs from the timing provided by said time base.

4. The control channel timing monitoring system as in claim 1 further including means for automatically generating calibration data in response to comparison, during a calibration routine, of timing of said first pulse timing signal with the timing of said reference signal.

5. In a simulcast radio frequency (RF) communications system that simulcasts identical signals as a sequence of frames, each frame including a portion containing digital control signals and a portion containing frame synchronization signals, from at least first and second transmission sites having corresponding geographical coverage areas over a same outbound RF control channel, where a portable or mobile radio monitors the digital control signals in each frame transmitted by said first transmission site and obtains synchronization with said first transmission site using said frame synchronization signals transmitted by said first transmission site, a method of monitoring control channel timing comprising the steps of:

(a) receiving at a receiver other than said portable or mobile radio said sequence of flames transmitted over the air by said first transmission site;

(b) providing a reference timing signal;

(c) determining whether the timing of frame synchronization signals included in said sequence of frames received by said receiver in step (a) is synchronized to at least within a predetermined tolerance with said reference timing signal; and (d) generating a fault indication if said determining step (c) reveals that said received frame synchronization signals are not synchronized with said reference timing signal to at least within said predetermined tolerance.

6. A method as in claim 5 wherein the step (b) of providing a reference timing signal comprises a step of generating a master timing signal that controls the timing of said frame synchronization signals transmitted over the air by said first transmission site.

7. A method as in claim 5 further including a step of automatically generating calibration data by comparing the timing of received frame synchronization signals with said reference timing signal.

8. In a simulcast radio frequency (RF) communications system of the type that simulcasts identical sequential frames of signals, with each frame including a portion containing digital trunking control signals and a portion containing frame synchronization signals, from at least first and second transmission sites over a same outbound RF control channel, where a portable or mobile radio monitors the digital control signals in each frame transmitted by said first transmission site and obtains synchronization with said first transmission site using said frame synchronization signal transmitted by said first transmission site, a control channel timing monitoring system comprising:

a first radio receiver other than said portable or mobile radio that receives said sequential frames transmitted by said first transmission site over said outbound RF control channel and generates a first timing signal in response to frame synchronization signals included in said sequential frames received by said first radio receiver;

a second radio receiver other than said portable or mobile radio that receives said frame synchronization signals transmitted by said second transmission site over said control channel and generates a second timing signal in response to said frame synchronization signals received by said second radio receiver; and a timing comparator, coupled to said first and second receivers, for comparing the timing of said first timing signal with the timing of said second timing signal and for generating a fault indication if said comparison reveals the timing of said first timing signal differs by more than a certain amount from the timing of said second timing signal.

9. In a simulcast radio frequency (RF) communications system of the type that simulcasts digital control signals and frame synchronization signals from at least first and second transmission sites over the same outbound RF control channel, a method of monitoring control channel timing comprising:

receiving, at a first timing, said frame synchronization signals transmitted by said first transmission site over said RF control channel;

receiving, at a second timing, said frame synchronization signals transmitted by said second transmission site over said RF control channel;

comparing said first timing with said second timing; and generating a fault indication if said comparison reveals said first timing differs from said second timing by more than a predetermined amount.

10. A radio frequency control channel timing monitor comprising:

a radio frequency receiver that continually monitors frame synchronization signals included in each frame of control signals transmitted over the air on a digital radio frequency control channel and generates a timing signal indicating a timing of said transmitted frame synchronization signals; and a timing comparator connected to receive said timing signal, said timing comparator comparing said timing indicated by said timing signal with a reference timing and selectively generating a fault indication or not generating a fault indication depending on said comparison.

11. A radio frequency control channel timing monitor as in claim 10 wherein:

said radio frequency receiver monitors frame synchronization signals transmitted by a first simulcasting transmission site over said digital radio frequency control channel such that the timing signal generated thereby indicates the timing of said frame synchronization signals transmitted by said first simulcasting transmission site; and said radio frequency control channel timing monitor further includes a further radio frequency receiver that continually monitors frame synchronization signals transmitted by a further simulcasting transmission site over the air on said digital radio frequency control channel and generates a further timing signal indicating the timing of said frame synchronization signals transmitted by said further simulcasting transmission site.

12. A radio frequency control channel timing monitor as in claim 11 wherein said timing comparator compares the timing of said timing signal generated by said radio frequency receiver with the further timing signal generated by said further radio frequency receiver and produces a fault indication if said compared timings are not identical within a predetermined tolerance.

13. A radio frequency control channel timing monitor as in claim 11 wherein said timing comparator compares the timing of each of the timing signal and the further timing signal with the reference timing.

14. A radio frequency control channel timing monitor as in claim 10 wherein said timing comparator includes delay means for introducing a delay to compensate for inherent time delays between said timing signal and said reference timing.

15. A radio frequency control channel timing monitor as in claim 10 wherein said reference timing comprises a frame timing reference, and said timing comparator includes gating means for passing said timing signal only during a time window beginning a programmable time period after occurrence of said frame timing reference.

16. A radio frequency control channel timing monitor as in claim 10 wherein said radio frequency receiver includes means for generating a digital pulse each time a frame synchronization signal is received.

17. A radio frequency control channel timing monitor as in claim 10 wherein said radio frequency receiver includes means for detecting an occurrence of said frame synchronization signals and for producing a digital pulse in response to detection of frame synchronization signals.

\* \* \* \* \*